US010320753B1

(12) United States Patent
Ashley et al.

(10) Patent No.: US 10,320,753 B1
(45) Date of Patent: Jun. 11, 2019

(54) METHOD AND SYSTEM FOR PROVIDING PERSONA MASKING IN A COMPUTER NETWORK

(71) Applicant: Anonyome Labs, Inc., Draper, UT (US)

(72) Inventors: Paul Ashley, Queensland (AU); Steve Shillingford, Draper, UT (US); Simon Gee, Queensland (AU); Glen Leeder, Queensland (AU); Greg Clark, San Francisco, CA (US)

(73) Assignee: Anonyome Labs, Inc., Draper, UT (US)

( * ) Notice: Subject to any disclaimer, the term of this patent is extended or adjusted under 35 U.S.C. 154(b) by 201 days.

(21) Appl. No.: 15/001,132

(22) Filed: Jan. 19, 2016

Related U.S. Application Data

(60) Provisional application No. 62/257,636, filed on Nov. 19, 2015.

(51) Int. Cl.
| | |
|---|---|
| *G06F 7/04* | (2006.01) |
| *H04L 29/06* | (2006.01) |
| *H04L 12/58* | (2006.01) |
| *G06F 17/30* | (2006.01) |

(52) U.S. Cl.
CPC ........ *H04L 63/0421* (2013.01); *H04L 51/046* (2013.01); *H04L 63/0272* (2013.01)

(58) Field of Classification Search
CPC ............. H04L 63/0281; H04L 63/0407; H04L 63/0471; H04L 67/02; H04L 67/28
USPC .......................... 726/12, 26, 7; 713/153, 193
See application file for complete search history.

(56) References Cited

U.S. PATENT DOCUMENTS

| | | | | |
|---|---|---|---|---|
| 7,519,834 B1* | 4/2009 | Dondeti | ................ | H04L 63/065 713/190 |
| 8,074,270 B1* | 12/2011 | Lordello | ................. | H04L 45/04 726/13 |
| 8,687,485 B1* | 4/2014 | Dondeti | ............. | H04L 63/0272 370/230 |
| 9,294,507 B1* | 3/2016 | Roth | ....................... | H04L 63/20 |
| 9,430,641 B1* | 8/2016 | Marion | ................... | G06F 21/53 |
| 9,438,564 B1* | 9/2016 | Weng | ................. | H04L 63/0281 |
| 2009/0217351 A1* | 8/2009 | Burch | ................. | H04L 63/0281 726/3 |
| 2010/0125897 A1* | 5/2010 | Jain | ..................... | H04L 63/0272 726/7 |
| 2011/0107414 A1* | 5/2011 | Diab | ................... | G06F 21/6218 726/15 |
| 2011/0231654 A1* | 9/2011 | Somadder | ........... | H04L 12/5691 713/153 |
| 2012/0002813 A1* | 1/2012 | Wei | ..................... | H04L 63/0272 380/270 |

(Continued)

*Primary Examiner* — Gary S Gracia
(74) *Attorney, Agent, or Firm* — Cooley LLP

(57) ABSTRACT

A machine has a processor and a memory connected to the processor. The memory stores instructions executed by the processor to allow a user to designate a selected persona from a pool of potential personas, where each potential persona is associated with the user and has a distinct set of computer network attributes. A virtual private network egress point for the selected persona is designated, where the virtual private network egress point masks computer network attributes of the selected persona. Contact with the virtual private network egress point is coordinated to initiate a network communication for the selected persona.

5 Claims, 5 Drawing Sheets

(56) References Cited

U.S. PATENT DOCUMENTS

| | | | | |
|---|---|---|---|---|
| 2012/0005476 A1* | 1/2012 | Wei | ................... | H04L 63/0272 |
| | | | | 713/153 |
| 2012/0023570 A1* | 1/2012 | Gorodyansky | ..... | H04L 63/0407 |
| | | | | 726/12 |
| 2013/0212465 A1* | 8/2013 | Kovatch | ............... | G06F 17/227 |
| | | | | 715/234 |

* cited by examiner

METHOD AND SYSTEM FOR PROVIDING PERSONA MASKING IN A COMPUTER NETWORK

CROSS-REFERENCE TO RELATED APPLICATION

This application claims priority to U.S. Provisional Patent Application Ser. No. 62/257,636 filed Nov. 19, 2015, the contents of which are incorporated herein by reference.

FIELD OF THE INVENTION

This invention relates generally to individuals communicating in computer networks. More particularly, this invention relates to techniques for providing persona masking in a computer network.

BACKGROUND OF THE INVENTION

With the current state of identity theft, uncontrolled data collection and targeted marketing, there is a need for a user to protect their primary identity and to compartmentalize their online activity. For example, the user might prefer to use their primary identity for general browsing or reading online newspapers, separated from accessing and commenting on social media, separated from purchasing from e-commerce applications, and separated from selling their furniture on eBay®.

One method to achieve this separation (or compartmentalization) is to allow a user to create multiple personas and then use them for different purposes. Each persona would have its own identity attributes which may include name, address, date of birth, phone, email, credit and delivery address. Each persona should be used for a limited and specific purpose. Consequently, tracking of that identity would not form a complete picture of the user's activity. The personas act as a personal privacy proxy, not allowing Internet services access to the user's primary identity.

One limitation when using personas from a single device, e.g., mobile, desktop, or from multiple devices attached to the same network, is that the network address (IP address) can be used for persona tracking. The network address reveals information about the user's personas, e.g., personas are related, a persona and a primary identity are related, a persona exists at a certain physical location.

Through the direct connection from a user's device to an Internet server, the Internet server has access to the device's IP address and can correlate personas or can do a simple reverse lookup of IP address to retrieve location. The location information is very accurate. While the IP address may come directly from the device, it may be that the user's device or devices are behind a firewall that provides a network address translation (NAT) service. Although the NAT stops the original IP address from being visible, it doesn't reduce the ability to track personas.

Tracking of the IP address allows Internet sites to profile personas and primary identity. This in turn allows the Internet service to customize marketing messages, customize pricing, record a persona's browsing habits, and so on. By itself an IP address provides a lot of useful information to an organization trying to profile and track a particular user.

A solution is therefore required to provide masking of the persona's IP address to thwart the tracking of personas. It is important that the solution allows the IP address to be different for each persona. Also because persona supporting applications are used by technically unskilled (normal) users the solution should provide protection without having a major impact on the user experience. The solution should automate the masking of the IP address without requiring constant vigilance of the user

SUMMARY OF THE INVENTION

A machine has a processor and a memory connected to the processor. The memory stores instructions executed by the processor to allow a user to designate a selected persona from a pool of potential personas, where each potential persona is associated with the user and has a distinct set of computer network attributes. A virtual private network egress point for the selected persona is designated, where the virtual private network egress point masks computer network attributes of the selected persona. Contact with the virtual private network egress point is coordinated to initiate a network communication for the selected persona.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
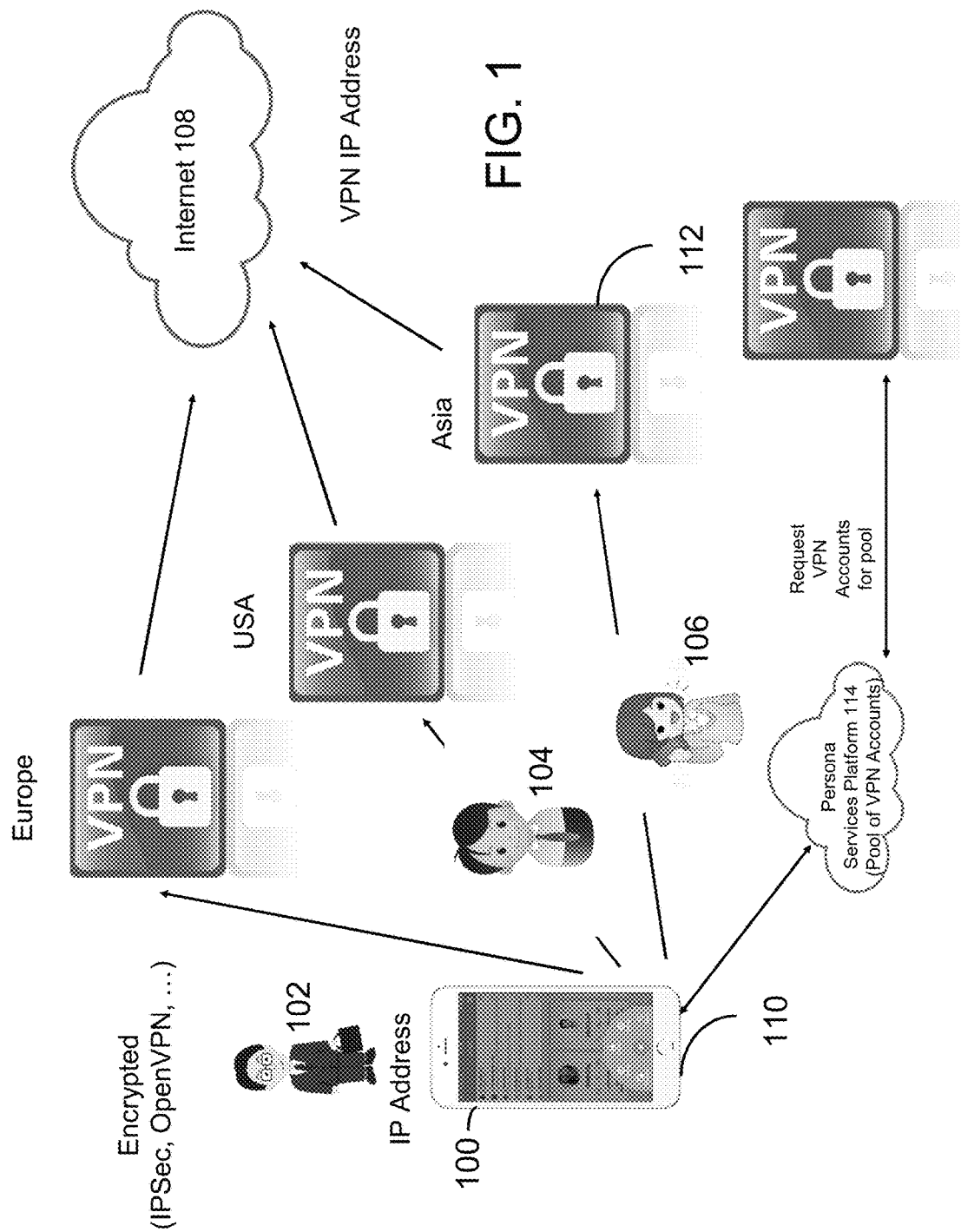
FIG. 1 illustrates a system configured in accordance with an embodiment of the invention.

FIG. 1 shows an overview of the invention. A client device 100 has a persona application 110 that supports multiple personas 102, 104, 106. Each persona is associated with a single user and has a distinct set of computer network attributes, such as email address, telephone number, user name, and the like.

The application is used to access the Internet 108 via one of the personas. This application supports a range of persona based services such as persona based browsing, short message service (SMS) communications, multi-media message services (MMS) communications, email and voice calling. The application could be installed on a mobile device, desktop or similar device.

The aim of the solution is to protect the device's IP address from the services the personas are accessing. To enable the network location of each persona to be masked, the application uses an embedded Virtual Private Network (VPN) client to route the user's traffic to a VPN server 112. This way by routing the traffic through an intermediate VPN server, the IP address of the user's device is hidden from the Internet server being accessed. In this way, the VPN masks computer network attributes of a selected persona.

Depending on the active persona, the persona supporting application automatically routes the connection to a different VPN server egress point. Each of the user's personas may use a different location.

Also shown is the application reaching out to a persona services platform 114 implementation that contains a pool of VPN user accounts. So that the traffic coming from different personas and devices can't be correlated easily by the VPN service, a random VPN account is selected for each persona on each device. The combination of VPN account pooling and automatic egress point selection for each persona provides strong protection.

A common solution that is used on the Internet to mask a device's IP address from an Internet server is a VPN service. A VPN provides an encrypted tunnel from the user's device, e.g., mobile or desktop to a VPN server. Most VPN services use standardized protocols, e.g., OpenVPN, IPSec and so on. Also shown is a separate connection made from the VPN server to the Internet 108. Due to the separate connection, the Internet server sees an IP address owned by the VPN provider rather than the original user's IP address.

VPN providers typically have a number of data centers in different locations around the world, e.g., VyprVPN. A user can choose their egress location from the VPN service that suits the location in which they want their traffic to appear. The user may be using their device from Austin, Tex. but their traffic can be routed through the VPN provider's data center in New York City, Europe or Asia.

To the Internet server it therefore appears that the user has an IP address from the location of the VPN service's data center, rather than the user's actual location. Also note that the IP address will most likely change each time the service is invoked as the VPN services carry pools of IP addresses which they regularly take in and out of service (called IP address tumbling).

There is a natural alignment of the use of multiple VPN egress points and IP address tumbling and the need to mask persona network addresses. So that personas can't be correlated together, or correlated with the user's primary identity, or the user's physical location determined, the persona application establishes a connection with a different VPN Server (egress point) as the active persona changes. If a user wishes a persona to appear to be in London, then the egress point is selected as London.

A user that is regularly changing their active personas can't be expected to manually switch between different egress points. Therefore an aspect of the solution is to automate the selection of VPN server (VPN provider egress point) in the persona application based on the active persona. The automation is crucial as the user will forget on occasion to change egress point as they swap from one persona to another, therefore unintentionally allowing tracking of their IP address.

In the example of FIG. 1, each of the user's three personas has a different location. The user will have selected the location in the persona's configuration. In the figure one persona resides in Europe, another in the USA and the third in Asia. The personas application looks at the location settings of each persona, and as the user changes active persona, changes the VPN egress point to match.

A further consideration relates to the VPN account used by a persona to access the VPN service. When a user accesses a VPN service they typically use their assigned VPN account. During VPN connection establishment an authentication occurs verifying the user has an account on the VPN provider. This authentication is typically accomplished using either username/password or via a client certificate based protocol.

The problem of using this same approach with personas is that it allows the VPN provider to easily track persona activity. This is because every connection of the user's personas on every one of user's devices uses the same VPN account. Because every persona is using the same user account the VPN service can easily correlate all traffic from the user's persona and their primary identity.

To overcome this limitation, when a user subscribes to the VPN on their persona application, the application reaches out to a pool of VPN user accounts. A different VPN user account is allocated for each persona on the device. If the user has a second device, then the same process occurs, with a different set of VPN user accounts being allocated to the user's personas. The accounts of each of these personas and devices can be cycled at regular intervals.

The personas services layer communicates with the VPN service to request individual user accounts. These accounts are stored in a pool in the persona services layer. When the persona application is activated it communicates with the persona services layer to request a user account for each of its personas on the device. These user accounts are returned to the pool when the application is closed, or cycled after a preset time interval.

When a user is accessing the application on another device, then the application communicates again with the persona services layer to request accounts for each persona. The idea is that these accounts are unrelated to the accounts on the user's first device, making persona correlation more difficult.

The approach provides a number of benefits. For the user there is an increased convenience, as the user does not need to know anything about the VPN accounts and can leverage the persona applications authentication to the persona services to retrieve them. Additionally, the solution provides greater protection to a persona as it is more difficult to correlate users, personas and devices.

Figure 2:
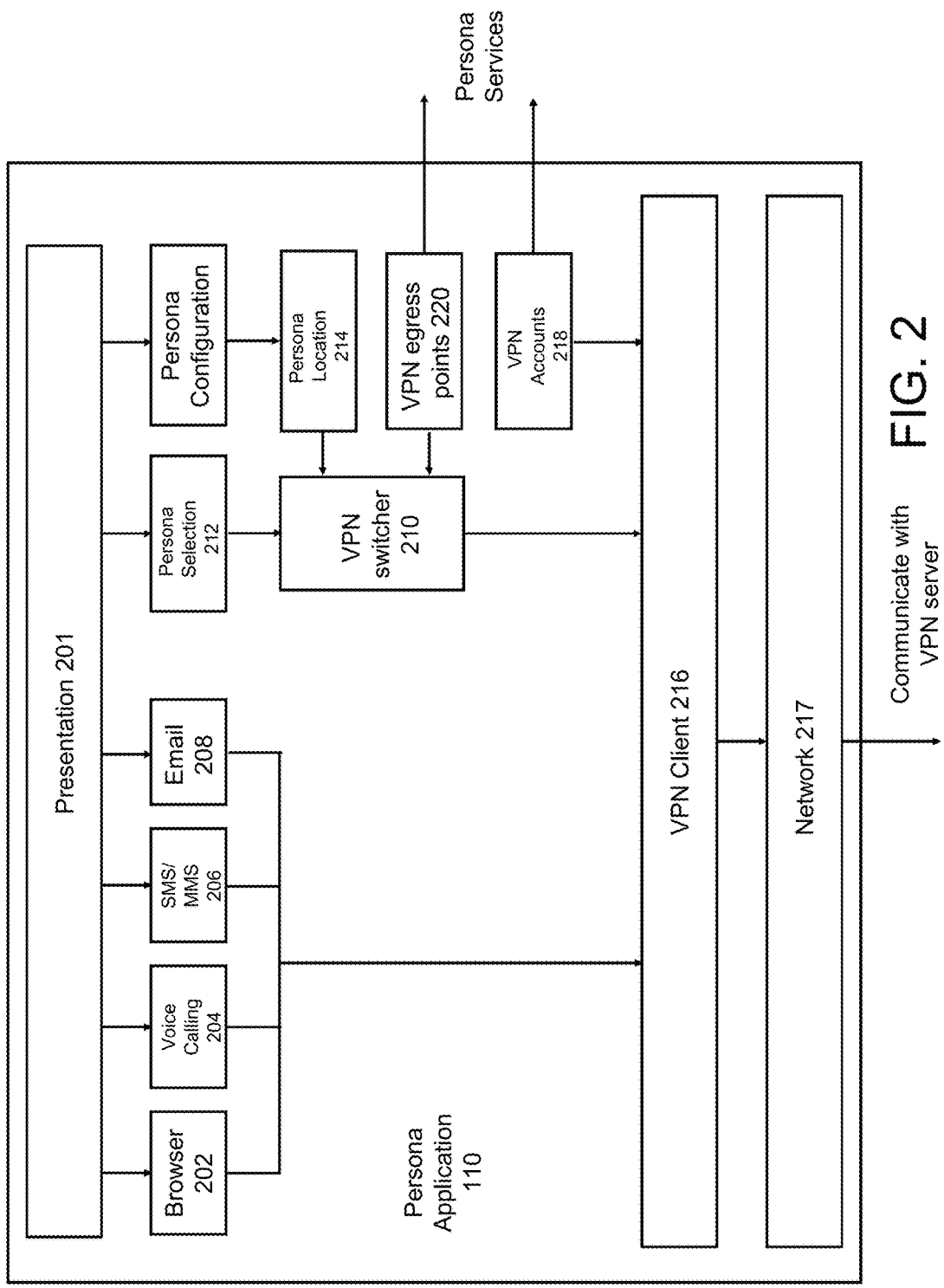
FIG. 2 a persona application configured in accordance with an embodiment of the invention.

FIG. 2 shows elements of the persona application 110 that provide network location masking. The user accesses the application through a presentation layer 201. In that layer the user is able to select the active persona, configure a persona, and have access to the personas functions, e.g., browser 202, voice calling 204, SMS/MMS 206 and email 208. The VPN switcher 210 accesses a persona selection module 212, a persona location module 214, and selects the appropriate VPN egress point and provides this to the VPN client 216, which communicates with a network layer 217. In one embodiment, the persona location is used to inform a selection of a persona. The persona application 110 then communicates with the designated VPN server. Alternately, the communication with the designated VPN server may be initiated by the persona service platform 114, which subsequently switches the session to the application 110.

A VPN account component 218 and VPN egress point component 220 communicate with the persona services platform 114 to retrieve a different VPN user account for each of the user's personas as well as the current list of available VPN egress points.

Figure 3:
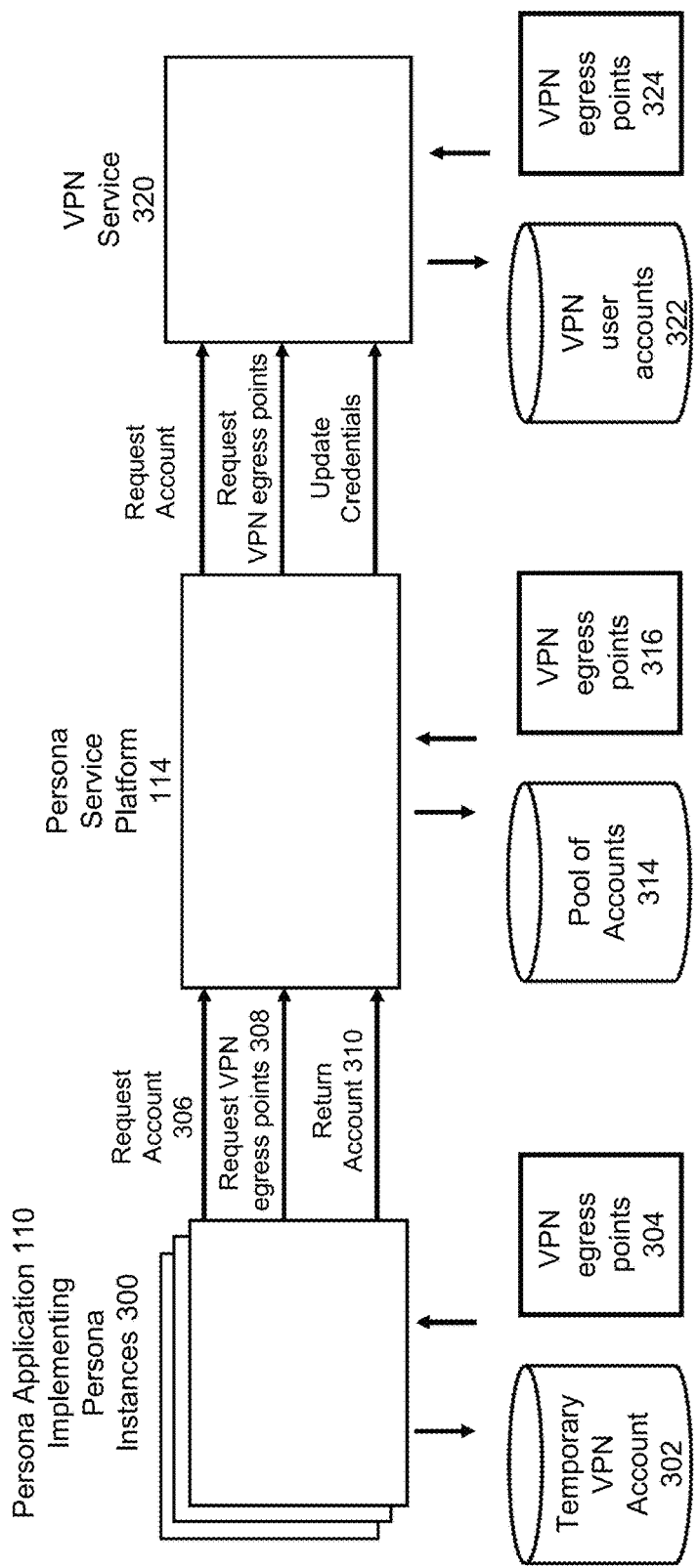
FIG. 3 illustrates the disclosed application communicating with a persona services platform and a VPN service in accordance with an embodiment of the invention.

FIG. 3 shows how the VPN user accounts and egress points are managed in the solution. A user has multiple persona application instances 300 on different devices. Each personal application instances 300 caches VPN accounts 302 and VPN egress points 304.

Each of these application instances calls out to the persona service platform 114 to request VPN user accounts 306 for each of their personas as well as an updated list of egress points 308. The application returns the VPN user accounts 310 when the application closes. Also after a defined period the application will cycle its VPN user accounts with the persona services layer.

In the center of FIG. 3 is the persona services layer or persona service platform 114. Its key role is to manage a pool of VPN user accounts 314 that can be supplied to persona applications. It communicates to the VPN service to request individual VPN user accounts to provide to its pool. If the pool is running low, it requests more accounts. It also has the task of updating the credentials of the user accounts in its pool, e.g., refreshing the password at a pre-defined interval. It also has the task of keeping up to date with the VPN services egress points 316 and supplying these to the persona application.

On the right of FIG. 3 is the VPN service 320. Its role is to provide the VPN infrastructure (VPN servers) and also the user accounts for connecting to the VPN service. The VPN service 320 manages the VPN user accounts 322 and VPN egress points 324.

The system as described provides an effective way to protect the user's personas from being tracked by the VPN service. However, it is not perfect, because the VPN service still has access to the original device's IP address and can therefore track the user's persona communication.

Figure 4:
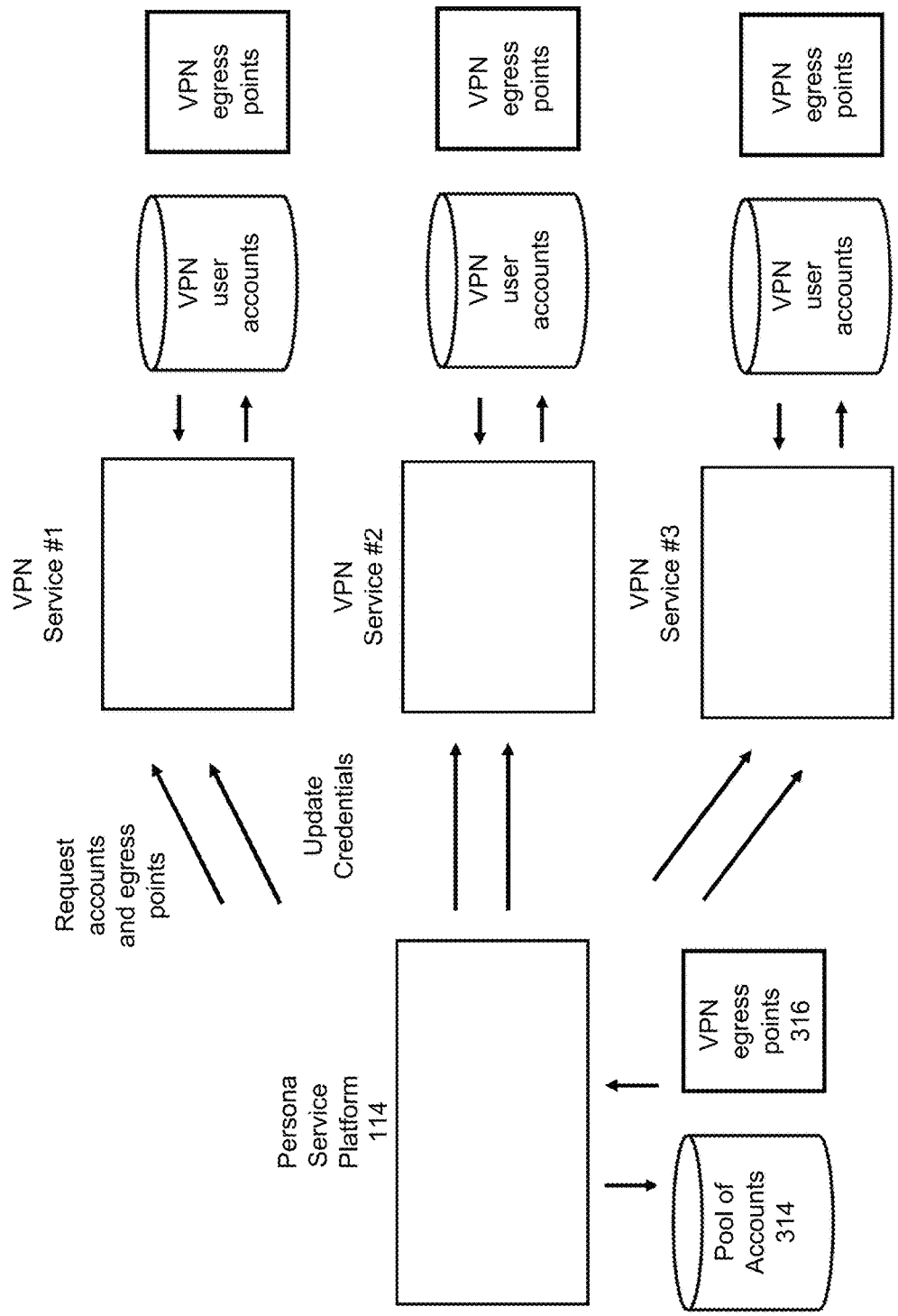
FIG. 4 illustrates a multiple VPN service implementation in accordance with an embodiment of the invention.

To improve the overall solution multiple VPN providers are recommended, as shown in FIG. 4. In this case, the persona services layer 114 communicates with multiple VPN providers, and builds a pool of accounts from all of the providers. It also associates each set of accounts with the VPN service's egress points.

Figure 5:
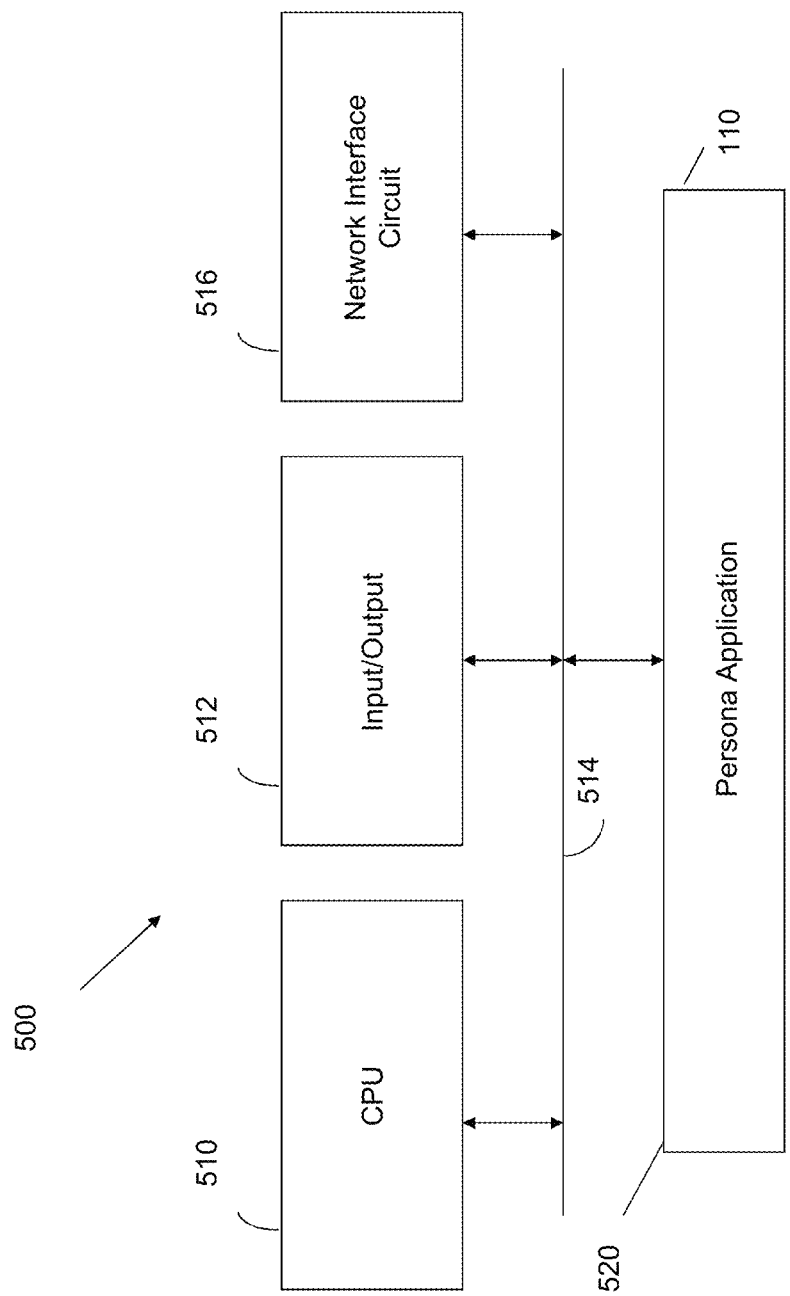
FIG. 5 illustrates a computer configured in accordance with an embodiment of the invention.

FIG. 5 illustrates a computer 500 configured in accordance with an embodiment of the invention. The computer 500 includes a central processing unit 510 connected to input/output devices 512 via a bus 514. A network interface circuit 516 is also connected to the bus 514 to provide connectivity to different networks. A memory 520 is also connected to the bus 514. The memory 520 stores instructions executed by the CPU 510. In particular, the memory 520 stores a persona application 110 to implement the operations disclosed herein. That is, the persona application implements the architecture of FIG. 2 and the interactions of FIGS. 3 and 4.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
a processor; and
a memory connected to the processor, the memory storing instructions executed by the processor to:
host a persona service platform to allow a user to designate a selected persona from a pool of potential personas, wherein each potential persona is associated with the user and has a distinct set of computer network attributes including a user name and email address, wherein each potential persona is associated with a compartmentalized online activity and therefore is operative as a personal privacy proxy, and
designate a virtual private network egress point for the selected persona, wherein the virtual private network egress point masks computer network attributes of the selected persona, wherein the virtual private network egress point for the selected persona is automatically selected from a pool of virtual private network egress points utilized by the pool of potential personas and wherein each potential persona is associated with a different virtual private network user account; and
wherein the persona service platform allows the user to have multiple persona instances on different devices and each persona instance uses a different VPN account and VPN egress point, thereby VPN accounts are unrelated, making the user's persona correlation more difficult to discover.

2. The machine of claim 1 wherein the selected persona is designated as a function of persona physical location.

3. The machine of claim 1 wherein the network communication is selected from a browser session, a voice call, a short message service communication, a multimedia message service communication and an email.

4. The machine of claim 1 wherein the virtual private network egress point is selected from one of a plurality of virtual private network services, each of which hosts a plurality of virtual private network egress points.

5. The machine of claim 1 wherein the persona service platform communicates with virtual private networks to obtain virtual private network user accounts.

* * * * *